Patented Nov. 15, 1949

2,488,298

UNITED STATES PATENT OFFICE 2,488,298

METHOD OF PRODUCING HEXAFLUOROPHOSPHORIC ACID

Willy Lange, Cincinnati, Ohio, and Ralph Livingston, Oak Ridge, Tenn., assignors to Ozark-Mahoning Company, a corporation of Delaware No Drawing. Application September 12, 1946, Serial No. 696,620

2 Claims. (Cl. 23—139)

This invention relates to the production and the purification of hexafluorophosphoric acid, $HPF_6$, and to the production of its crystalline hydrated form, hexafluorophosphoric acid hexahydrate, $HPF_6 \cdot 6H_2O$, the latter being a useful intermediate product in the purification of the acid as well as commercially valuable in itself; for brevity they will hereinafter be termed respectively "hexa acid" and "hexahydrate."

The reaction between phosphorus pentoxide ($P_2O_5$) and hydrofluoric acid (HF) is known to produce under appropriate circumstances certain fluorination products, and the copending application of Willy Lange for United States Letters Patent, Serial No. 542,603, filed June 28, 1944, now Patent No. 2,408,785, for Method of production of anhydrous monofluorophosphoric acid describes the conditions under which anhydrous mono- and difluorophosphoric acids are obtained therefrom, while in our copending application for United States Letters Patent, Serial No. 478,838, filed March 11, 1943, now Patent No. 2,408,784 for Anhydrous monofluorophosphoric acid and method of producing it, we have described the results of a certain reaction between metaphosphoric and hydrofluoric acids in the preparation of monofluorophosphoric acid.

It has heretofore been suggested that reaction of $P_2O_5$ with 40% aqueous HF may produce the hexa acid. The experiment, according to the suggestion in the technical literature, namely, reaction of 90 grams of $P_2O_5$ with 90 grams of 40% HF, resulted in a liquid yielding with nitron a precipitate weighing 2.25 grams. This precipitate indicated in the said liquid reaction product the presence of only 0.398% hexa acid which was mixed with the very large amount, namely 69%, of other phosphorus-containing acids. Furthermore, this very low concentration of $HPF_6$ could neither be increased through the use of known concentration methods nor could any separation of the hexa acid as such, from the other phosphorus-containing acids be accomplished. Again, the reaction product, after heating under closed-container conditions, i. e. no gaseous constituents escaping, and subsequent cooling, produced no precipitate with nitron, indicating that the hexa acid, initially present, was thermodynamically unstable in the system and could not have been produced in an equilibrium reaction, a conclusion we have confirmed by extensive experiments.

In our research in connection with introducing fluorine into phosphorus-containing compounds we have found, however, that under suitable conditions solutions can be produced which contain appreciable and large quantities of the hexa acid, $HPF_6$, in thermodynamically stable form. This acid apparently cannot be isolated in anhydrous form, a conclusion also confirmed by our experiments and consistent with the complex nature of the $HPF_6$ which contains pentavalent phosphorus, but solutions produced in accordance with our invention provide a source from which the hexahydrate in pure crystalline form may be isolated and/or recovered, and the invention accordingly contemplates production of this novel and useful composition which is a form of pure hexa acid in the presence of its water of crystallization.

Moreover, while hexa acid as such appears incapable of existence in the anhydrous pure state, we produce aqueous products containing it in ionized form in concentrations which render it available for practical use.

It is therefore a principal object of our invention to provide a method for producing and purifying products containing in commercially useful concentrations hexa acid responding to the formula $HPF_6$. A further object is to render available for practical use the crystallized hexahydrate as a composition of matter responding to the formula $HPF_6 \cdot 6H_2O$.

Other objects, purposes and advantages of the invention will hereafter appear or be understood from the following description of certain ways we have devised for carrying it out and attaining its objects.

Essentially, our method of producing hexa acid consists in mixing any one or a mixture of more than one of a group of compounds of pentavalent phosphorus, including orthophosphoric acid ($H_3PO_4$) and its fluorination and dehydration products hereinafter more fully described, with HF in such proportions and under such conditions that an equilibrium is established with hexa acid as a reaction product. Such equilibrium exists when there is no noticeable loss of hexa acid in the said reaction product when the latter is heated under conditions which prevent dissipation of any of its components by evaporation and then cooled to the original temperature (approximately room temperature or lower), that is, if the $HPF_6$ present hydrolyzes to a certain extent on such heating it is reformed in substantially like quantity on cooling; if the $HPF_6$ has not been formed in an equilibrium reaction, as herein defined, any $HPF_6$ present in the reaction product is thermodynamically unstable and disappears on such heating and subsequent cooling.

H₃PO₄ and all members of the group known as fluorination products of H₃PO₄, namely, Monofluorophosphoric acid (H₂PO₃F)
Difluorophosphoric acid (HPO₂F₂)
Phosphorus oxytrifluoride (POF₃)
Phosphorus pentafluoride (PF₅)

and all compounds or mixtures of compounds obtained by molecular dehydration of H₃PO₄, or by hydration of P₂O₅, or by reaction of molecular dehydration products of H₃PO₄ with P₂O₅ and its hydration products may be used for the production of hexa acid in accordance with our method; in addition to H₃PO₄ these include compounds such as:

Pyrophosphoric acid (H₄P₂O₇)
Triphosphoric acid (H₅P₃O₁₀)
Tetraphosphoric acid (H₆P₄O₁₃)
Metaphosphoric acid (HPO₃)
Hexametaphosphoric acid ((HPO₃)₆)
Polymetaphosphoric acid ((HPO₃)ₓ)
Phosphorus pentoxide (P₂O₅).

The compounds produced by molecular dehydration or by hydration processes and which have a composition lying between H₃PO₄ and P₂O₅ as the extremes, are usually referred to as "condensed" phosphoric acids. They, as well as P₂O₅, are characterized by the existence of oxygen bridges between phosphorus atoms in substantially all cases and, in contact with water, are hydrolyzed with the result that H₃PO₄ is the final and only ultimate product of hydrolysis. Orthophosphoric acid is also the final product of hydrolysis of the above mentioned fluorine derivatives of H₃PO₄. Some of these condensed phosphoric acids are not chemical individuals but must be considered as mixtures. This fact, however, does not impair their usefulness in the process of our invention as any mixture consisting of condensation or dehydration products of H₃PO₄ may be used successfully.

In reacting any of the said compounds, and particularly the known dehydration and/or fluorination products of H₃PO₄, or mixtures of any of or all these compounds, with HF, whether anhydrous or in aqueous solution, there should be present in the reaction, or produced thereby, sufficient water to provide a medium for electrolytic dissociation of HPF₆ and the formation of PF₆⁻ and H₃O⁺ ions; under these conditions and in accordance with our invention the equilibrium which is established is shifted by heating under closed-container conditions, although the original composition of the reaction product is reestablished on cooling to the original temperature, that is to room temperature or lower.

The theoretically required quantity of fluorine necessary for the complete transformation of the phosphorus compound into HPF₆ is available when the materials are present in a ratio corresponding to 6 atoms of fluorine per atom of phosphorus.

In carrying out the several reactions contemplated by our invention, consideration must be given to the fact that the equilibrium constants are not the same for all possible concentrations of the starting components. We have noted that the equilibrium constant increases with increasing HF concentration in the starting mixture and decreases with the concentration of water present at the outset. Thus, over a wide range of concentrations, the equilibria deviate from the law of mass action. As a consequence, certain limits for the ratios of the starting ingredients supplied must be observed so that HPF₆ may be produced in equilibrium. When these limits are approached very small quantities of the acid are formed. Beyond these limits, either no HPF₆ is produced, or the relatively insignificant amount thereof which may appear initially in the reaction product of P₂O₅ and aqueous HF is thermodynamically unstable, is not in equilibrium in the reaction product, and disappears on heating the product.

With increasing concentration of HF, still within the limits of the appropriate HF:P ratio, substantially increased yields of HPF₆ are obtained, with the maximum when anhydrous HF is used, although as has been noted some water must be either supplied with the starting ingredients, as in the case of PF₅, or produced in the reaction in the cases of all the other P compounds mentioned to afford an ionization medium for HPF₆. Water as an added ingredient is necessary when PF₅ and anhydrous HF are used, since none is produced from these compounds and hence no HPF₆ can be formed. With a small amount of water present, however, reaction between PF₅ and HF proceeds satisfactorily to produce HPF₆ while the water resulting from the reaction of anhydrous HF with the other P compounds which have been mentioned as starting ingredients is adequate or more than adequate to meet ionization requirements of the HPF₆ produced.

The several reactions contemplated by the invention do not require temperature control and may be carried out above room temperature if a closed system is employed so that no component of the reaction mixture can escape in vapor form.

The following equilibrium equations set forth assumed reactions with HF of several of the most common of the known compounds in the family or group of pentavalent phosphorus compounds suitable for use in accordance with the invention, indicating certain quantities of water are produced in anhydrous systems from all except PF₅; these quantities are ample or more than ample for the required ionization of the HPF₆ produced in each case, and intermediate reaction products are not noticed in the equations as they preferably do not appear in substantial quantities in the final equilibria:

$$P_2O_5 + 12HF \rightleftharpoons 2HPF_6 + 5H_2O \quad (1)$$
$$HPO_3 + 6HF \rightleftharpoons HPF_6 + 3H_2O \quad (2)$$
$$H_3PO_4 + 6HF \rightleftharpoons HPF_6 + 4H_2O \quad (3)$$
$$H_4P_2O_7 + 12HF \rightleftharpoons 2HPF_6 + 7H_2O \quad (4)$$
$$H_2PO_3F + 5HF \rightleftharpoons HPF_6 + 3H_2O \quad (5)$$
$$HPO_2F_2 + 4HF \rightleftharpoons HPF_6 + 2H_2O \quad (6)$$
$$POF_3 + 3HF \rightleftharpoons HPF_6 + H_2O \quad (7)$$
$$PF_5 + HF + H_2O \rightleftharpoons HPF_6 + H_2O \quad (8)$$

Equation 1 represents a reaction directly between P₂O₅ and HF but when these compounds are combined in the presence of water, or with evolution of it, some of or all the P₂O₅ may first become hydrated to form one or more of its hydration products such as HPO₃, H₃PO₄ and H₄P₂O₇ which then react with the HF in accordance with Equations 2, 3 or 4, as the case may be.

Similarly, any of the compounds, P₂O₅, its hydration products, H₃PO₄ and its dehydration products, may react first with HF to produce initially lower fluorination products including H₂PO₃F, HPO₂F₂, POF₃ or PF₅, which then react further with additional HF to produce successively higher fluorination products; the results in such cases are the ultimate production of $HPF_6$ substantially in accordance with Equations 5, 6, 7 and 8.

In the reaction of $H_3PO_4$ with HF under the conditions of our invention, substantially all the intermediate equilibria are established in succession in a swift sequence. If the ratio $HF:H_3PO_4$ in the starting mixture is comparatively low, the presence of $H_3PO_4$, $H_2PO_3F$ and $HPO_2F_2$ as well as $HPF_6$, in the final equilibrium product can be shown by analytical means. Obviously, therefore, any of the fluorinated intermediates between $H_3PO_4$, and $HPF_6$ may be used in the production of the hexa acid solutions. If the ratio of anhydrous $HF:H_3PO_4$ is high, a large part of the $H_3PO_4$ is transformed into $HPF_6$ and correspondingly less of any of the intermediates remains in the equilibrium product.

The $HPF_6$ is formed in an equilibrium which is shifted, i. e. forced more and more to the left side of the equation, by water in excess of minimum requirements, and hence the highest concentrations of $HPF_6$ are obtained in the product when such excess is kept at a minimum. Thus with a given ratio of anhydrous HF or of the required concentration of aqueous HF, Reactions 7 and 8, in which $POF_3$ and $PF_5$ are used, yield the highest concentrations of $HPF_6$ since these reactions produce the smallest quantities of water or no water; they are followed in turn by $HPO_2F_2$, Reaction 6, and $HPO_3$, Reaction 2, and so on, with the lowest concentration from $H_3PO_4$, as its Reaction 3 produces 4 moles $H_2O$ with each mole $HPF_6$. However, if some of the water, which would otherwise be formed during the establishing of the equilibrium in a mixture of $H_3PO_4$ and HF, is removed before the mixture is prepared, as by molecular dehydration of water-free $H_3PO_4$ to so-called condensed phosphoric acids or to the highest stage of molecular dehydration, namely, to $P_2O_5$, then the concentration of $HPF_6$ will be accordingly higher than in the product obtained from $H_3PO_4$.

Specifically, the mechanism of the reactions between molecular dehydration products of $H_3PO_4$ and aqueous HF is, to a great degree, unknown, but these dehydration products do not become components of the final equilibrium. In fact, $H_3PO_4$ is the only fluorine-free phosphorus compound found after equilibrium has been established, suggesting that all its molecular dehydration products which are not transformed into fluorinated compounds are transformed into $H_3PO_4$ which then becomes a true component of the equilibrium to a greater or less degree depending on the concentration of the aqueous HF employed. The mechanism of the reaction when anhydrous HF is used is known to some extent; thus if $HPO_3$ and anhydrous HF are reacted at or above the minimum ratio required by our invention, $H_2PO_3F$ is formed first and then passes rapidly through a sequence of equilibria in which $HPO_2F_2$, $POF_3$, $PF_5$ and $HPF_6$ are successively produced.

Moreover, to obtain the maximum transformation of a P compound into $HPF_6$ in the reaction product, some excess of HF is necessary over the theoretically required amount as indicated in the respective equations; if less is supplied but within the limits to which reference has been made, the reaction proceeds toward the right side of the equation but to a correspondingly lesser degree.

Again, while water is required in the reaction product as an ionization medium, it may be present as a diluent of the phosphorus-containing ingredients or of the HF, may be added to the reaction, or may result therefrom, but the amount present at the beginning of the reaction should be within certain limits as hereinafter more fully described.

While it is desirable for maximum production of $HPF_6$ that at least sufficient HF be present or supplied to satisfy the relation 6 F atoms for each P atom, if enough HF is used to satisfy the minimum requirements of our invention within the said limits as to the amount of water present, then at least some $HPF_6$ will be formed in an equilibrium reaction.

Our invention thus contemplates broadly the production of hexa acid in a reaction which leads to an equilibrium and in which any member of the $H_3PO_4$ family as herein described may be reacted with HF; the more important members of this family are represented by chemical formula in the following list: $P_2O_5$, $HPO_3$, $H_4P_2O_7$, $H_3PO_4$, $H_2PO_3F$, $HPO_2F_2$, $POF_3$ and $PF_5$, in which $H_3PO_4$ is the core of the family and is the substance into which each member of the group is transformed on complete hydrolysis. In general, subject to the maintenance of conditions which have been stated, the principal reactions taking place successively in mixtures of HF and certain typical members of the $H_3PO_4$ family may be represented by the following scheme:

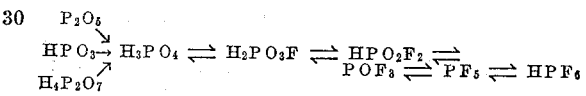

Inasmuch as water is formed along with the formation of $HPF_6$ in the above equilibrium reactions, water present at the beginning of the reaction prevents the equilibrium from being established far to the right side, and hence water-free members of the $H_3PO_4$ group, except $PF_5$, when reacted with anhydrous HF generally give the most favorable equilibrium conditions for the formation of $HPF_6$.

While we have observed that some equilibrium formation of $HPF_6$ occurs when hydrofluoric acid, especially at high concentrations or in anhydrous state, is supplied in quantity insufficient to satisfy the ratio 6 atoms F : 1 atom P, it is evident that under such conditions there is in effect an excess of the P-containing compound and hence a correspondingly smaller proportion of it enters into the formation of thermodynamically stable $HPF_6$ according to the same reactions as when at least 6 atoms F : 1 atom P is present.

An excess of HF above that required for satisfying this ratio usually tends to drive the equations toward the right, but when water is present in substantial quantities even greater amounts of HF must be supplied for best results and to offset its tendency to hamper the reactions. In any case water should not be present in the starting mixture in quantities in excess of the ratio 16.25 molecules $H_2O$ : 1 atom P, but within this limit addition of a suitable proportion of HF in excess of that required for the corresponding anhydrous reactions causes all the reactions to proceed satisfactorily. This additional HF is effective to counteract the hampering influence of water when the quantity of water in the starting mixture does not exceed 16.25 molecules $H_2O$ : 1 atom P, and the amount of HF required for this purpose is about that equivalent to the ratio 1 mole HF : 1.625 moles $H_2O$. If in the starting mixture at least this quantity of HF is present in addition to not less than 6 atoms F : 1 atom P the reactions proceed to equilibrium formation of HPF₆ in substantial quantities which are increased by further increasing the quantity of HF, other quantities remaining the same. If more water than corresponds to the ratio 16.25 H₂O : 1 P is present, however, any addition of even anhydrous HF, no matter how great, fails to produce equilibrium formation of HPF₆, but within the limits indicated greater or lesser amounts are produced depending upon the proportions of the reactants. A critical composition C of a starting mixture in which there is present just sufficient HF to satisfy the practical minimum ratio of 6 atoms F : 1 atom P and to counteract the effect of water is as follows:

$C = (a+b)$ molecules HF : 1 atom P : $(1.625 \times b)$ molecules H₂O in which $a$ is 6 minus the number of atoms of fluorine per atom of phosphorus in the phosphorus-containing compound and $b$ may have any value from 0 to 10, inclusive, except that for a phosphorus-containing compound devoid of oxygen, such as PF₅, it may not be 0.

We have stated that some equilibrium formation of HPF₆ may occur if anhydrous HF or aqueous HF of sufficiently great concentration be employed in quantities less than those corresponding to the sum of minimum ratios 6 atoms F : 1 atom P and 1 mole HF : 1.625 moles H₂O and thus insufficient even theoretically to convert all the phosphorus present to HPF₆, but as that portion thereof which is converted to HPF₆ enters into the hexa acid formation in correspondence with the 6 F : 1 P ratio, attainment of equilibria by the use of HF in quantities insufficient to satisfy the said ratio is nevertheless within the scope of our invention.

For practical purposes, however, not less than 6 atoms F : 1 atom P should be present in the starting mixture, and in addition 1 mole HF : 1.625 moles H₂O up to a maximum of 16.25 molecules H₂O : 1 atom P to obtain satisfactory yields of HPF₆ in equilibrium and we therefore generally prefer to adhere to such proportions and further to utilize more HF than specifically required thereby.

When just sufficient water-containing HF is supplied to attain the 6 F : 1 P ratio the water present in the acid partially counteracts the fluorinating effect of the HF and less than all of it is therefore available to react with the P-containing compound to produce HPF₆ but with higher concentrations at the same ratio there is, as noted, a sharp increase in HPF₆ yield, while some equilibrium formation of HPF₆ may occur at such higher concentrations if the HF supplied is insufficient to satisfy the 6 F : 1 P ratio. We have discovered, moreover, that when anhydrous HF is employed, even fairly substantial deficiencies of HF below the said ratio do not prevent entirely equilibrium formation of HPF₆, provided the anhydrous HF is in quantity sufficient to satisfy at least the following ratios:

| Starting Material | P₂O₅ | HPO₃ | H₄P₂O₇ | H₃PO₄ | H₂PO₃F | HPO₂F₂ | POF₃ |
|---|---|---|---|---|---|---|---|
| Lowest permissible ratio of Molecules anhydrous HF:1 Atom P in the starting mixture | 1.90 | 3.13 | 3.55 | 3.40 | 2.13 | 1.14 | 0.19 |

These lowest ratios, $r$, of molecules anhydrous HF : 1 atom P, wherein the equilibrium formation of a very small quantity of HPF₆ will just take place, may be expressed by the following empirical equation:

$$r = 0.76a + \frac{1}{100}(b(b-1))^2 + 0.85b(a-b-1) - 0.19c$$

in which $a$ is the number of oxygen atoms, $b$ the number of hydrogen atoms and $c$ the number of fluorine atoms per atom of phosphorus in the starting compound. However, if the compound contains no oxygen, HPF₆ can be produced in accordance with the invention only if some water is present in the mixture; thus, for example, in the presence of a very small quantity of water, even traces of HF added to PF₅ will result in the equilibrium formation of HPF₆.

It is usually uneconomical to supply HF in quantity much in excess of about 6 F : 1 P beyond any amount of HF required to counteract the effect of water present, as the yields of HPF₆ on very large increases of HF do not increase correspondingly; but chemically there is no maximum limitation on the quantity of anhydrous HF used, because we have found that even with the most excessive quantities of anhydrous HF, no compound containing more than 6 fluorine atoms in each molecule is formed. In other words, we have not found a compound in which the ratio of fluorine to phosphorus is higher than in HPF₆ and an increase in the quantity of HF above the stated minimum ratios therefore may shift the equilibrium to the right and increase the yield of HPF₆, but the HF present in excess of the ratio 6 F : 1 P remains in its original state in the final reaction product.

Several reaction mixtures have been tabulated as follows along with the calculated HFP₆ concentration expected in the product on the assumption the reactions go to completion. In addition, the percent HPF₆ formed in the equilibrium and actually found by analysis in the reaction products is given in the second column and the percent of calculated HPF₆ formed in the last column.

| Equations setting forth proportions of constituents used | Theoretical Percent HPF₆ | Actual Percent HPF₆ | Percent of Calculated HPF₆ |
|---|---|---|---|
| P₂O₅ + 12HF ⇌ 2HPF₆ + 5H₂O | 76.4 | 66.2 | 86.7 |
| HPO₃ + 6HF ⇌ HPF₆ + 3H₂O | 73.0 | 61.2 | 83.9 |
| H₃PO₄ + 6HF ⇌ HPF₆ + 4H₂O | 67.0 | 52.6 | 78.5 |
| H₂PO₃F + 5HF ⇌ HPF₆ + 3H₂O | 73.0 | 60.5 | 83.0 |
| HPO₂F₂ + 4HF ⇌ HPF₆ + 2H₂O | 80.2 | 75.0 | 93.5 |
| POF₃ + 3HF ⇌ HPF₆ + H₂O | 89.0 | 86.9 | 97.6 |
| PF₅ + HF + H₂O ⇌ HPF₆ + H₂O | 89.0 | 84.5 | 94.9 |

As has been pointed out, the use of water-containing HF in most cases causes equilibrium to be reached at somewhat lower concentrations of HPF₆ than when anhydrous HF is used. When, for instance, 1 mole P₂O₅ is reacted with 12 moles HF and 6 moles H₂O, only 48.2% of the theoretical quantity of HPF₆ is formed, as compared with 86.7% when anhydrous HF is used (see the first equation). When, however, in the first equation the quantity of HF is substantially increased over that theoretically required, the yield of HPF₆ is increased; for instance, 1 mole P₂O₅ reacted with about 21 moles anhydrous HF gave a product in which 98.9% of the theoretical quantity of HPF₆ was formed.

As it is advisable to prevent the escape of HF or other gaseous or volatile components, the reaction or succession of reactions therefore is preferably practised under conditions which retain them in the reaction chamber, at least until a condition of substantial equilibrium has been reached, which is usually within one to two hours under laboratory conditions. Thus the reactions may be carried out in an open vessel at reduced temperatures approaching or approximating that of dry ice to produce with suitable agitation substantially the maximum yield of HPF₆, and even with temperatures as high as 10° C., the yield may be satisfactory in many instances. At still higher temperatures loss of gases and/or vapors cannot readily be prevented unless the reactants are confined in a closed vessel under pressure of the gaseous or volatile substances supplied to or produced by the reaction, and the products cooled at least to room temperature before the vessel is opened.

The reactants, or at least one of them, should be introduced in small quantities, preferably during agitation of the mass, so gases and vapors may be more readily retained and either batch or continuous methods of operation afford good results provided the conditions stated be substantially observed. Of course in view of the nature of HF, the equipment should be adequately corrosion resistant and therefore made of or plated with platinum or silver, or be of special stainless steel or other suitable metal, or its surfaces should be coated with a resin or other substance not readily attacked by HF.

More specifically, procedures appropriate for carrying out the several reactions are as follows:

(a) For the reaction of phosphorus pentoxide, with anhydrous HF at the temperature of dry ice, small quantities of P₂O₅ are added slowly during stirring of the HF and preferably in total amount insufficient to theoretically satisfy all the latter, so that after completion of the reaction an excess of HF remains in the mass, which, after substantial equilibrium has been reached, is allowed to warm gradually to room temperature. If the P₂O₅ is placed in a pressure-tight vessel and anhydrous HF injected thereinto during mechanical agitation, cooling is unnecessary, and if sufficient HF is supplied to insure an excess over that theoretically required to react with all the P₂O₅ for the production of HPF₆, maximum yield of the latter is attained. Inasmuch as appreciable heat is evolved during the reaction the vessel should not be opened until after equilibrium has been reached and room temperature restored.

(b) As set forth in the second equation, HPO₃ and an excess of anhydrous HF may be mixed in a platinum vessel at the temperature of melting ice and the mass agitated for a sufficient period to insure equilibrium, with the temperature preferably maintained throughout at not in excess of 10° C.

(c) H₃PO₄ may be reacted with anhydrous HF in accordance with the third equation in substantially the same way.

(d) Commercially available pyrophosphoric acid contains other condensed phosphoric acids and orthophosphoric acid and may be utilized in the preparation of hexa acid. The equation $$H_4P_2O_7 + 12HF \rightleftharpoons 2HPF_6 + 7H_2O$$

thus is not precisely followed when commercial pyrophosphoric acid is mixed at about the temperature of melting ice with excess anhydrous HF, but the departure therefrom is of minor importance as the ingredients other than H₄P₂O₇ react with the HF in a generally similar manner.

(e) Likewise according to the given equations H₂PO₃F and HPO₂F₂ may be mixed with anhydrous HF, preferably at a temperature of −20° C. or thereabouts, and again with HF in excess of the theoretically required quantity for reacting with all the phosphorus containing constituents. These reactions may also occur as intermediate ones in connection with the production of HPF₆ from P₂O₅ and/or its hydration products since an initial reaction may result in creation of at least some H₂PO₃F and/or HPO₂F₂ which then reacts with additional HF.

(f) POF₃, being a gas at normal temperature and pressure, may be passed into liquid anhydrous HF cooled by dry ice, preferably until sufficient POF₃ has been dissolved in the liquid to react with all but a little of the anhydrous HF; attainment of substantial equilibrium usually requires several hours and the gas is therefore passed slowly into the HF to prevent wasting it.

POF₃ may be obtained from any available source or may be produced by methods disclosed in the literature. Of these we prefer to employ the reaction between calcium fluoride (CaF₂) and phosphorus pentoxide (P₂O₅) as described by Tarbutton, Egan and Frary in the Journal of the American Chemical Society, vol. 63, page 1782 (1941).

(g) A similar procedure may be followed for the reaction of HF with gaseous PF₅, indicated in the last equation of the tabulation, although, if desired, temperatures up to −10° C. may be used in this case, and as has been noted, it is essential that at least a small amount of water be present to afford an ionization medium for the HPF₆ produced. The gaseous PF₅ may also be forced with pressure into a closed vessel containing the hydrofluoric acid, at temperatures substantially above −10° C.

Production of HPF₆ by the reaction of HF with PF₅ is claimed in our copending divisional application, Serial No. 789,758, filed December 4, 1947, entitled Method of producing hexafluorophosphoric acid.

The reactions of the several tabulated equations thus produce high concentration hexa acids when a minimum quantity of water, or none at all, is present at the start of the reaction and correspondingly lower concentrations of HPF₆ as the amount of water present at the start approaches the maximum which is permissible.

For the best production of HPF₆, we therefore prefer to limit the amount of water present at the start of the reaction; but as 6 molecules of water per 1 molecule HPF₆ are required for production of crystalline hexahydrate, the reaction products may be further diluted after equilibrium has been reached if necessary for maximum yield of hexahydrate by crystallization.

The hexahydrate, as far as we know, was nonexistent prior to our discovery of it, but we can now recover it by cooling hexa acid of suitable concentration. Depending on the HPF₆ concentration, crystallization may begin just below 31.5° C., the melting point of hexahydrate crystals or at a lower temperature, and continues during further reduction of temperature. As the crystals sometimes form relatively slowly, reduction in temperature should progress gradually and the hard coarse crystals of the hexahydrate may readily be separated from the surrounding liquid by centrifuging, filtration, pressing between layers of a water-free absorbent material like well-dried filter paper or by any other suitable mechanical means. During the separation the crystals should be kept at a temperature below their melting point (about 31.5° C.), and even after separation their exposure to temperatures not far from their melting point, and especially to conditions of high relative humidity, should be avoided since they are very deliquescent and so tend to absorb moisture rapidly from the air and return to solution.

Even if the $HPF_6$ solution contains up to about 10 molecules of $H_2O$ per molecule of $HPF_6$, corresponding to about 44.8% $HPF_6$, the hexahydrate may be crystallized readily therefrom within the temperature range 31.5° C. to -35° C., and still more dilute solutions may under certain circumstances yield small quantities of hexahydrate crystals at extremely low temperatures. But when crystallized hexahydrate is to be recovered from very dilute solutions, we prefer to use a preliminary concentrating step, introducing the solution into a high vacuum at temperatures below 30° C. either in a thin film or in any other form offering evaporating surfaces constantly renewed, as by spraying into an evacuated vessel or the like.

Crystallization of the hexahydrate may be considered either as a step in a method of producing this substance or as one for purifying a hexa acid containing, in addition to the $HPF_6$, various other substances, such as foreign matter, intermediate products of reaction, or even remaining unreacted portions of the initial reactants, since pure hexa acid solutions may readily be reconstituted by dissolving hexahydrate crystals in water. For example when $P_2O_5$ is employed and the HF supplied converts less than all the phosphorus present to $HPF_6$, the solution may contain after equilibrium has been established minor quantities of $H_2PO_3F$ and/or $HPO_2F_2$, and unreacted HF. Hexahydrate crystals may, however, form in the reaction product on suitable cooling, and may easily be separated from the liquid containing such other substances, and then be dissolved in water to produce a pure hexa acid solution.

The hexa acid in the crystallized hexahydrate keeps indefinitely in its pure form. When the hexahydrate is melted, the liquid still represents a pure $HPF_6$ containing about 42.5% $H_2O$. However, when the liquid stands at temperatures above that of the melting point, the hexa acid equilibrium is established slowly with the disappearance of some water and the formation of some HF and $HPO_2F_2$ as indicated by the following general scheme:

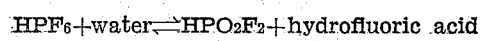

$HPF_6 + water \rightleftharpoons HPO_2F_2 + $ hydrofluoric acid

For producing pure salts thru the use of the hexahydrate, we therefore prefer to neutralize the hexahydrate crystals with metal oxides, hydroxides, etc., or to use the melted hexahydrate or its aqueous solution without allowing them to stand after melting. We have observed that with increasing dilution of the hexahydrate with water (and the same is true for any hexa acid preparation), the establishment of an equilibrium, resulting in hydrolysis of some $HPF_6$, becomes slower and slower until at concentrations of only a few percent $HPF_6$, the acid seems to be perfectly stable and does not seem to establish an equilibrium.

This, however, is not true. Such a high dilution, if not in equilibrium, is thermodynamically unstable. Much time may be required for the equilibrium to establish itself, but heating under closed-container conditions, followed by cooling establishes this equilibrium at once. The described facts are also the reason why the freak $HPF_6$, formed in traces in the reaction of $P_2O_5$ with aqueous HF in proportions beyond the limits prescribed in our invention, can exist for a certain time while it is actually thermodynamically unstable.

A hexa acid prepared in accordance with our disclosures is a non-oxidizing agent which may be used advantageously in organic reactions as a condensing or polymerizing or esterifying catalyst. Hexa acid, in the form of an equilibrium product or after isolation as the hexahydrate, is useful also as an electrolyte. The salts of the hexa acid are made readily through neutralization of the acid with metal oxides, hydroxides, carbonates, etc. These salts are applicable, among other purposes, in electroplating, in electrodeposition of metals from electrolytic baths and for other electrochemical work. Organic hexafluorophosphates can be prepared and may find general application in the manufacture of various organic compounds; when they are utilized in processes similar to those in which the corresponding perchlorates have been employed or would have been employed, if the perchlorates had been less dangerous, the danger of explosion inherent in use of organic perchlorates does not exist since the hexafluorophosphates are apparently non-explosive. The aromatic diazonium salts, possessing very limited solubility in water and excellent stability in dry form, are convenient sources of $PF_5$, a gas which is itself a useful polymerization catalyst.

We shall now set forth more specifically in several illustrative instances the manner in which our invention has been employed for the production of useful substances without, however, intending thereby to limit or confine it thereto.

*Example 1.*—48.9 parts of $P_2O_5$ were added slowly in small portions to 82.5 parts of liquid anhydrous HF, in a ratio of 12 moles HF : 1 mole $P_2O_5$, cooled with dry ice in a platinum bottle and constantly stirred during the addition of the $P_2O_5$; after gradual warming to room temperature the mixture was found to contain 66.2% $HPF_6$ or approximately 86.7% of the amount theoretically obtainable from said quantities of the ingredients reacting in accordance with the equation:

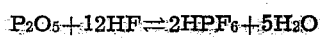

$$P_2O_5 + 12HF \rightleftharpoons 2HPF_6 + 5H_2O$$

65.7 parts of the reaction product were cooled in ice and 18.5 parts of water of ice temperature added. The resulting mixture was kept for one day at 10° C. during which a crystalline precipitate of 65.4 parts of hexahydrate was formed, accounting for 86.3% of the $HPF_6$ originally present in the reaction product and thus recovered as crystalline hexahydrate.

*Example 2.*—Anhydrous HF and $P_2O_5$ reacted under conditions similar to those in Example 1 but in the proportion of 71.5 parts anhydrous HF and 24 parts $P_2O_5$, in a ratio of 21.15 moles HF : 1 mole P₂O₅, produced a solution containing 51.1% HPF₆ or 98.9% of the quantity theoretically obtainable from reaction of the stated quantities of the reactants.

*Example 3.*—36.8 parts of HPO₃ mixed slowly at ice temperature with 55.8 parts of anhydrous HF, in a ratio of 6.064 moles HF : 1 mole HPO₃, were agitated mechanically for one day in a closed platinum bottle maintained at a temperature of 10° C. The resulting solution on analysis was found to contain 60.9% HPF₆ or 83.9% of the quantity theoretically obtainable from the initial amounts of the ingredients reacting in accordance with the equation:

$$HPO_3 + 6HF \rightleftharpoons HPF_6 + 3H_2O$$

*Example 4.*—50 parts of liquid anhydrous HF in a platinum bottle was cooled with brine at −10° C.; water-free H₃PO₄ was slowly added to the HF while the latter was being stirred, until 40 parts in all had been supplied, in a ratio of 6.124 moles HF : 1 mole H₃PO₄. The whole mixture was then allowed to warm gradually to room temperature, a portion of the product analyzed and the HPF₆ content determined with nitron ($C_{20}H_{16}N_4$). In accordance with the equation, $H_3PO_4 + 6HF \rightleftharpoons HPF_6 + 4H_2O$, a solution containing 66.2% HPF₆ theoretically should have been produced; analysis showed 52.0% HPF₆ actually present, indicating an actual yield of 78.5% of the theoretical one.

A quantity of the solution was set aside for one day and maintained at temperature of 15° C.: a cake formed consisting of coarse grainy crystals which after separation from the liquid and drying between layers of thoroughly pre-dried filter paper were found to consist of substantially pure hexahydrate in a yield of 60.7 parts and to contain 74.5% of the HPF₆ originally in the solution. The remaining liquid contained but relatively little water inasmuch as originally there was not enough to supply water of crystallization for all the HPF₆, thus indicating that a larger yield of hexahydrate might have been obtained had more water been present. The crystals on analysis were found to contain 57.38% HPF₆, as compared with 57.46%, the theoretical value of HPF₆ in the hexahydrate.

*Example 5.*—32.73 parts of commercial tetraphosphoric acid containing 36.2% phosphorus was mixed with 45.86 parts of liquid anhydrous HF at ice temperature and resulted in a solution which contained 58.8% HPF₆, corresponding to a yield of 82.9% of the quantity theoretically obtainable.

*Example 6.*—21.9 parts of liquid anhydrous HF in a platinum bottle cooled with brine at −20° C. was stirred during addition in small quantities of 21.6 parts of pure commercial H₂PO₃F, in a ratio of 5.069 moles HF : 1 mole H₂PO₃F. After gradual warming to room temperature the resultant solution was analyzed and found to contain 60.1% HPF₆, corresponding to a yield of 83.0% of the quantity theoretically produced in accordance with the equation:

$$H_2PO_3F + 5HF \rightleftharpoons HPF_6 + 3H_2O$$

*Example 7.*—39.1 parts of liquid anhydrous HF in a platinum bottle cooled with brine at −20° C. was stirred during addition in small quantities of 49 parts of pure commercial HPO₂F₂, in a ratio of 4.069 moles HF : 1 mole HPO₂F₂. After gradual warming to room temperature the resultant solution contained 74.4% HPF₆, corresponding to a yield of 93.5% of the quantity theoretically produced in accordance with the equation:

$$HPO_2F_2 + 4HF \rightleftharpoons HPF_6 + 2H_2O$$

*Example 8.*—5.1 parts of liquid anhydrous HF in a platinum bottle was cooled with dry ice while 8.3 parts of gaseous POF₃ was passed into the liquid in a ratio of 3.194 moles HF : 1 mole POF₃. After cooling overnight in dry ice the mixture was slowly warmed to room temperature and found on analysis to contain 84.9% HPF₆, corresponding to a yield of 97.6% of theoretical value in accordance with the equation:

$$POF_3 + 3HF \rightleftharpoons HPF_6 + H_2O$$

*Example 9.*—1.9 parts of a 52.6% HF solution was cooled in a platinum bottle to −10° C. and 6.3 parts of gaseous PF₅ passed into the liquid, in a ratio of 1 mole PF₅ : 1 mole HF : 1 mole H₂O. The resulting solution contained 84.5% HPF₆ corresponding to a yield of 94.9% of the theoretical yield.

*Example 10.*—A quantity of a solution, obtained by the reaction of P₂O₅ with a 67.2% HF solution in a ratio of 1 mole P₂O₅ : 12.34 moles HF : 6.684 moles H₂O and containing 27.6% HPF₆, was cooled to 15° C., maintained at the temperature for 12 hours and then further cooled to 10° C. and maintained at that temperature during the subsequent 12 hours. The crystalline precipitate of hexahydrate produced was analyzed quantitatively and found to contain 75.5% of the HPF₆ content of the original solution. 15 parts of the crystalline hexahydrate dissolved in an excess of ice-cooled aqueous ammonium (25% NH₃) was evaporated in a silver dish on a steam bath to just short of dryness, the residue then dried on filter paper in the air, redissolved in hot water, filtered, made slightly ammoniacal and the steam bath evaporation repeated. After final drying on filter paper the second residue contained 8.7 parts of pure ammonium hexafluorophosphate, indicating a yield of 90.4%.

*Example 11.*—To 7.9 parts of 85% potassium hydroxide (KOH) dissolved in 24 parts of water and cooled in a salt-ice mixture, 14.6 parts of a 74.4% hexa acid was gradually added during agitation of the KOH solution. A precipitate, gel-like in appearance but actually well crystallized, formed immediately and when removed by filtration, pressed between layers of absorbent paper and finally dried on a porous plate, was found to consist of 8.2 parts of relatively pure potassium hexafluorophosphate which recrystallized readily from boiling water made slightly alkaline with KOH and was thus recovered in an even more highly purified state.

*Example 12.*—To illustrate further the use of our HPF₆ solution we mixed 9.3 parts of aniline, 20 parts of water and 24.7 parts of 37% hydrochloric acid, keeping the mixture at ice temperature and agitating it during further slow addition of 6.9 parts of sodium nitrite dissolved in 20 parts of water. To the clear phenyl diazonium chloride solution obtained, 23 parts of a 74.4% HPF₆ solution was added, accompanied by instantaneous formation of a paste of fine crystals which was filtered on a Buechner funnel with suction, washed with 40 parts of ice water, then with ethyl alcohol, finally with ether, and thereafter dried on a porous plate. Analysis showed a yield of 20.3 parts of phenyl diazonium hexafluorophosphate which after drying in a desiccator over P₂O₅ was thermally decomposed into liquid phenylfluoride (C₆H₅F) and gaseous PF₅.

It will be understood all the foregoing examples are for purposes of illustration only and that they are not intended as restrictive of the manner in which either the hexa acid solutions or the hexahydrate in crystalline form may be produced, of the objects of such production or the usefulness of the products.

It will therefore be understood that while we have herein described in accordance with the statute what we now consider the preferred procedure for practising the invention we recognize that many modifications and variations, both chemical and physical, will occur to those skilled in the art and may be employed, if desired, without departing from the spirit and scope of the invention as defined in the appended claims.

Having thus described our invention, we claim and desire to protect by Letters Patent of the United States:

1. The method of producing hexafluorophosphoric acid by equilibrium formation which comprises reacting phosphorus oxytrifluoride with hydrofluoric acid in the ratio of about 3 moles of hydrogen fluoride per mole of phosphorus oxytrifluoride in a mixture containing not less than one additional molecule of hydrogen fluoride per 1.625 molecules of uncombined water present in the original reaction mixture and not over 16.25 molecules of uncombined water per atom of phosphorus, preventing the escape of gaseous compounds during the reaction and carrying said reaction substantially to completion in accordance with the equation $$POF_3 + 3HF = HPF_6 + H_2O$$

whereby substantially all the phosphorus atom is converted to hexafluorophosphoric acid.

2. A crystalline composition of matter, hexafluorophosphoric acid hexahydrate, corresponding chemically to the formula $HPF_6 \cdot 6H_2O$ and having a melting point of about 31.5° C.

WILLY LANGE.
RALPH LIVINGSTON.

REFERENCES CITED

The following references are of record in the file of this patent:

UNITED STATES PATENTS

| Number | Name | Date |
|---|---|---|
| 2,408,785 | Lange | Oct. 8, 1946 |

OTHER REFERENCES

Technical Service Bulletin FPA-1, Monofluorophosphoric Acid, Difluoro-Phosphoric-Acid, page 3, Copyright 1944, Ozark Chemical Co., Tulsa, Oklahoma.